US010820749B2

(12) United States Patent
Savioz

(10) Patent No.: US 10,820,749 B2
(45) Date of Patent: Nov. 3, 2020

(54) IN-LINE HEATING DEVICE

(71) Applicant: Nestec S.A., Vevey (CH)

(72) Inventor: Grégory Savioz, Saxonne (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/098,275

(22) PCT Filed: Jun. 16, 2017

(86) PCT No.: PCT/EP2017/064731
§ 371 (c)(1),
(2) Date: Nov. 1, 2018

(87) PCT Pub. No.: WO2017/220436
PCT Pub. Date: Dec. 28, 2017

(65) Prior Publication Data

US 2019/0150661 A1 May 23, 2019

(30) Foreign Application Priority Data

Jun. 22, 2016 (EP) .................................... 16175694

(51) Int. Cl.
*A47J 31/54* (2006.01)
*H05B 6/10* (2006.01)
*F24H 1/10* (2006.01)
*A47J 31/44* (2006.01)

(52) U.S. Cl.
CPC ......... *A47J 31/542* (2013.01); *A47J 31/4485* (2013.01); *F24H 1/101* (2013.01); *F24H 1/105* (2013.01); *H05B 6/108* (2013.01); *F24H 2250/08* (2013.01)

(58) Field of Classification Search
CPC ..... A47J 31/4485; A47J 31/542; F24H 1/101; F24H 1/105; F24H 2250/08; H05B 6/108
USPC ........ 219/629, 301, 298, 299, 543; 392/479, 392/480, 482, 495, 496, 304; 165/154,
(Continued)

(56) References Cited

U.S. PATENT DOCUMENTS 7,070,743 B2 * 7/2006 Blackwell .............. B01J 12/007
422/186.01
2002/0083840 A1 7/2002 Lassota
(Continued)

FOREIGN PATENT DOCUMENTS

CA 2943040 A1 11/2015
CN 203116109 U 8/2013
(Continued)

OTHER PUBLICATIONS

International Search Report dated Sep. 13, 2017 in PCT/EP2017/064731, filed Jun. 16, 2017.

(Continued)

*Primary Examiner* — Dana Ross
*Assistant Examiner* — Ket D Dang
(74) *Attorney, Agent, or Firm* — K&L Gates LLP

(57) ABSTRACT

A foaming machine providing a fluid foam and/or a food product foam, the machine being configured to receive an in-line heating device, the in-line heating device includes a primary heating unit and a heating cartridge. The heating cartridge includes an inner heating path. A system for providing a hot fluid foam and/or a hot food product foam.

19 Claims, 5 Drawing Sheets

(58) Field of Classification Search
USPC ........ 165/141, 140; 428/36.9, 210; 338/242, 338/293, 294, 301, 302, 308, 309
See application file for complete search history.

(56) References Cited

U.S. PATENT DOCUMENTS

2005/0095168 A1* 5/2005 Centanni .................. A61L 2/07 422/3
2008/0011336 A1 1/2008 Hamaguchi
2010/0000980 A1* 1/2010 Popescu ................. A47J 36/20 219/201
2013/0319259 A1* 12/2013 Ait Bouziad ....... A47J 31/4485 99/453
2014/0020563 A1* 1/2014 Etter .................... A47J 31/542 99/281
2014/0124502 A1 5/2014 Kwon
2014/0150991 A1* 6/2014 Holten et al. ........... A47J 31/54 165/76
2014/0197158 A1 7/2014 Ijuin et al.
2014/0322412 A1* 10/2014 Buchholz ................ A01J 11/04 426/474
2015/0068404 A1* 3/2015 Rivera ............... A47J 31/0678 99/285
2015/0157169 A1* 6/2015 Kruger ............... A47J 31/4492 426/232
2015/0216353 A1* 8/2015 Polti ...................... A47J 31/52 426/433
2016/0030900 A1* 2/2016 Jin et al. .................. B01F 3/04

FOREIGN PATENT DOCUMENTS

EP 0472272 A2 2/1992
JP 10307957 A 11/1998
JP 2004214039 A * 7/2004 ........... F24H 10/101
WO 2004062320 A1 7/2004

OTHER PUBLICATIONS

Written Opinion of the International Searching Authority, dated Sep. 13, 2017 in PCT/EP2017/064731, filed Jun. 16, 2017.

* cited by examiner

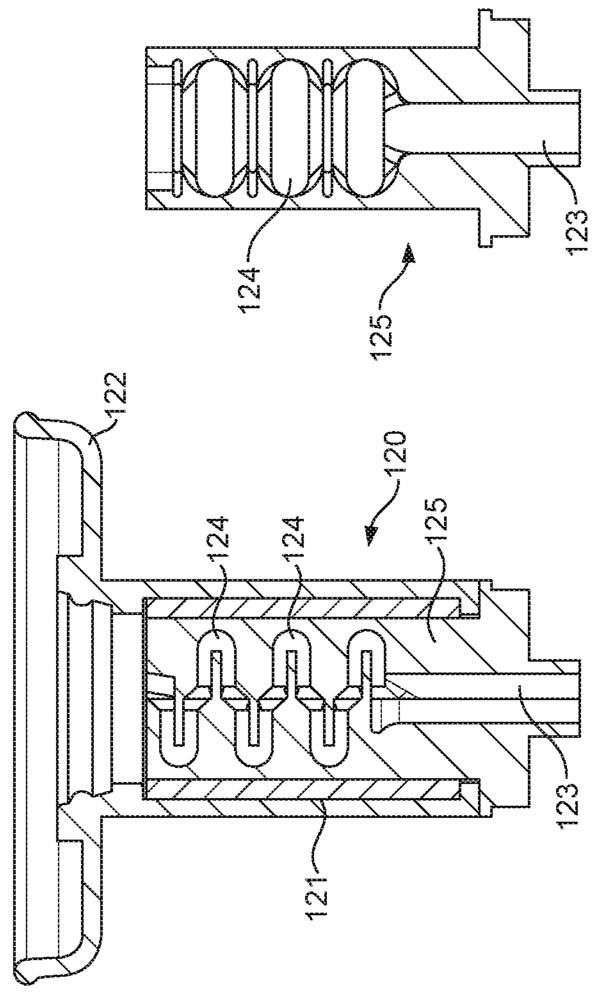
FIG. 5C
FIG. 5B
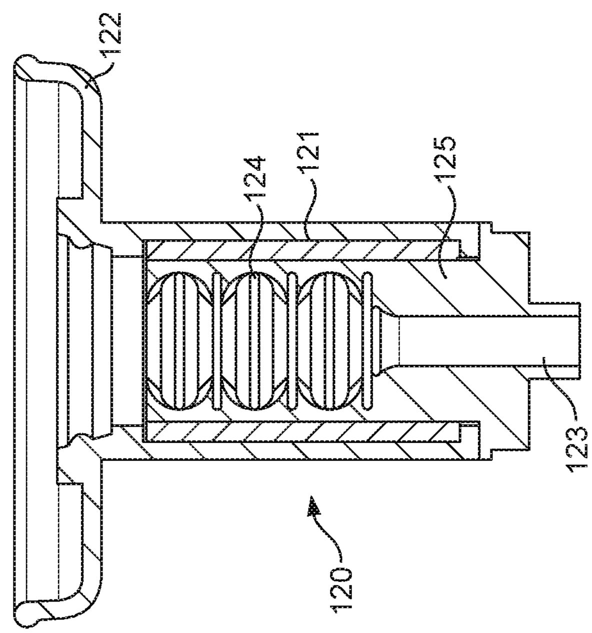
FIG. 5A

IN-LINE HEATING DEVICE

CROSS-REFERENCE TO RELATED APPLICATIONS/INCORPORATION BY REFERENCE STATEMENT

This application is a US national stage application filed under 35 USC § 371 of International Application No. PCT/EP2017/064731, filed Jun. 16, 2017; which claims priority to EP App No. 16175694.5, filed Jun. 22, 2016. The entire contents of the above-referenced patent applications are hereby expressly incorporated herein by reference.

TECHNICAL FIELD

The present disclosure is directed to a device for in-line heating a fluid or a food product, particularly a fluid foam or a food foam, in order to deliver hot foams on demand, the heating being done by induction.

BACKGROUND

Fluid foams consist of two phases, an aqueous phase and a gaseous (air) phase. A fluid foam is a substance which is formed by trapping many gas bubbles in a fluid structure: producing a fluid foam involves not only the generation of these gas bubbles, but also the packing and the retention of these bubbles into the overall fluid structure in order to provide a stable foam.

Nowadays, there exists the trend of consuming a wider variety of coffee types, most of them containing considerably more milk than before. These new coffee types comprise very often milk foams, so providing a good quality foam which is stable for a long time is a present need. As a consequence, there is a strong need for a foam heating technology, particularly for a milk foam heating technology for a wide range of businesses, particularly involving beverage preparations. As for now, no practical cleaning solution exists and the consumer always has to clean parts of the machine through which milk circulated: this becomes a hassle when milk is involved because milk deteriorates rapidly with time and the system needs to be thoroughly cleaned very often, preferably after each use. Superior quality milk foam is also more and more required and the heating system has to be smartly designed so as not to decrease the foam quality and provide a superior in cup result, providing at the same time practical and easy cleaning ways.

At present, there exist current systems which are able to provide superior quality milk foam: this milk foam is generated from cold milk and is then heated up at a later stage so that the creamy texture is kept stable for a longer period of time: this entrains the difficulty of being able to heat up the foam without degrading its texture.

There are different ways of heating up cold milk foam known in the state of the art. Some use a heat transfer device, such as for example a thermoblock, which heats the milk foam once it has been produced. The problem of using such heat transfer devices is that they need to be deeply cleaned every day as milk fluid circulates within the heat transfer device, can deteriorate and be a source of contamination when staying longer in the device. Moreover, these systems are cleaned preferably by being rinsed using several times the amount of water they would require for a normal operation or dosing. Some other known systems use a direct flow of steam through the milk foam already formed in order to heat it up: however, this destroys the texture of the milk foam thus providing very low quality foam in cup.

Typically, existing heating solutions for fluids and fluid foams are bulky and not cleanable, such as for example those using a thermoblock. The fact that they cannot be cleaned makes it impossible to be used with products such as milk. On the other hand, existing solutions using direct steam injected to both foam and heat a fluid destroy the foam (particularly when talking of micro foams) with its high energy.

Other heating solutions known in the state of the art, for example those using removable electric heaters, present the drawback of using electric connectors which may be dangerous when being manipulated.

Induction heating technology is already used in cooking systems (induction pans, cookers, etc.) as per US 2014124502, for example, and is also starting to be used in several beverage systems. Example of these are heating beverage cans (as per US 2014197158 or JPH 10307957 for example), urns (US 2002083840) or stoves (CN 203116109). In all these known examples, heating is done in batches and in-line and/or controlled heating is not possible.

It is therefore one non-limiting object of the present disclosure to provide a gentle, non-destructive and powerful heating system for superior quality milk foam on demand, having a controlled heating, which is easy to operate and to clean and maintain by a user.

BRIEF DESCRIPTION OF THE DRAWINGS

Further features, advantages and objects of the present disclosure will become apparent for a skilled person when reading the following detailed description of non-limiting embodiments of the present disclosure, when taken in conjunction with the appended drawings, in which:

FIGS. 5*a-c* show different views a possible configuration of a heating cartridge used in an in-line heating device according to a third embodiment of the present disclosure.

DETAILED DESCRIPTION

Figure 1:
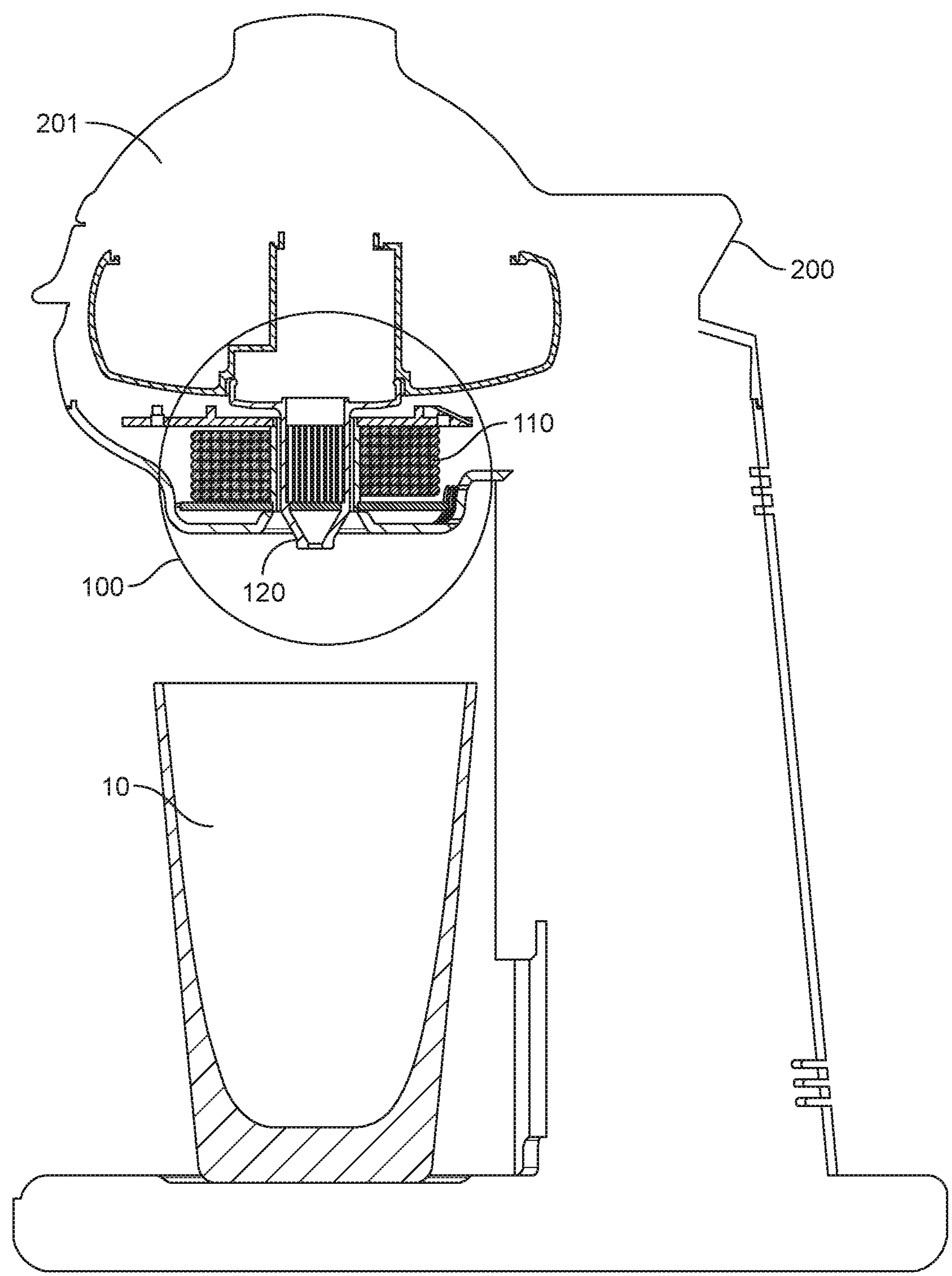
FIG. 1 shows a general cross-sectional view of the in-line heating device according to the present disclosure.

According to a first aspect, the present disclosure relates to an in-line heating device for heating a fluid and/or a food product and/or a fluid foam and/or a food foam, the device comprising a heating cartridge and a primary heating unit. The heating cartridge comprises an outer insert made of an electrically conductive material and being inductively heatable by an oscillating magnetic field provided by the primary heating unit; the heating cartridge further comprising an inner heating path through which the fluid and/or food product and/or fluid foam and/or food foam circulates; the heating path being arranged inside the outer insert so that fluid is heated while circulating through the path and before being delivered from the device.

In certain non-limiting embodiments, the heating provided depends on the distance between the primary heating unit and the outer insert. Typically, the primary heating unit and the outer insert are distanced by a separated heating space of a dimension allowing that the outer insert is at least partially positioned inside the magnetic field generated by the primary heating unit.

In certain non-limiting embodiments, the primary heating unit comprises a primary induction coil. Typically, the heating cartridge is configured removable from the rest of the device.

Typically, the heating cartridge is configured having an external cylindrical shape: the outer insert is configured as a cylindrical sleeve matching the external shape of the cartridge.

In certain non-limiting embodiments, the cartridge comprises a heating insert with an inner shape configuring the heating path: the cartridge typically further comprises the outer insert configured as a sleeve surrounding the outer periphery of the heating insert. In certain non-limiting embodiments, the heating insert is made of a thermally conductive material, such as (but not limited to) aluminium.

Typically, the outer insert is configured as a single ferromagnetic piece also configuring a heating insert with an inner heating path.

In certain non-limiting embodiments, the outer insert is configured comprising at least two complementary shaped bodies, the bodies configuring internally the heating path when brought together, and where the bodies are joined by means of joining means, allowing the assembly and disassembly of the bodies.

Typically, the cartridge further comprises a nozzle housing arranged to externally surround both the heating insert and the outer insert, the housing being, in certain non-limiting embodiments, made of a non-conductive material.

In certain non-limiting embodiments, the cartridge comprises a heating insert configuring itself a heating path with spiral shape, made in a non-conductive material, the path being surrounded by an outer insert shaped as a sleeve.

According to a second aspect, the present disclosure refers to a foaming machine providing a fluid foam and/or a food product foam, the machine being configured to receive an in-line heating device as the one described.

The foaming machine typically further comprises a temperature sensor arranged in such a way to have close contact with the outer insert of the cartridge.

According to a third aspect, the present disclosure further refers to a system for providing a hot fluid foam and/or a hot food product foam, the system comprising a foaming machine as the one described and an in-line heating device also as described.

According to a fourth aspect, the present disclosure refers to the use of such a system for foaming a fluid and/or a food product and further heating it.

According to a first aspect, the present disclosure is directed to a heating device 100 for heating a fluid and/or a food product and/or a fluid foam and/or a food foam, the fluid, food product or foams being provided by a machine to which the device is connected, as it will be further explained in more detail.

Figure 2:
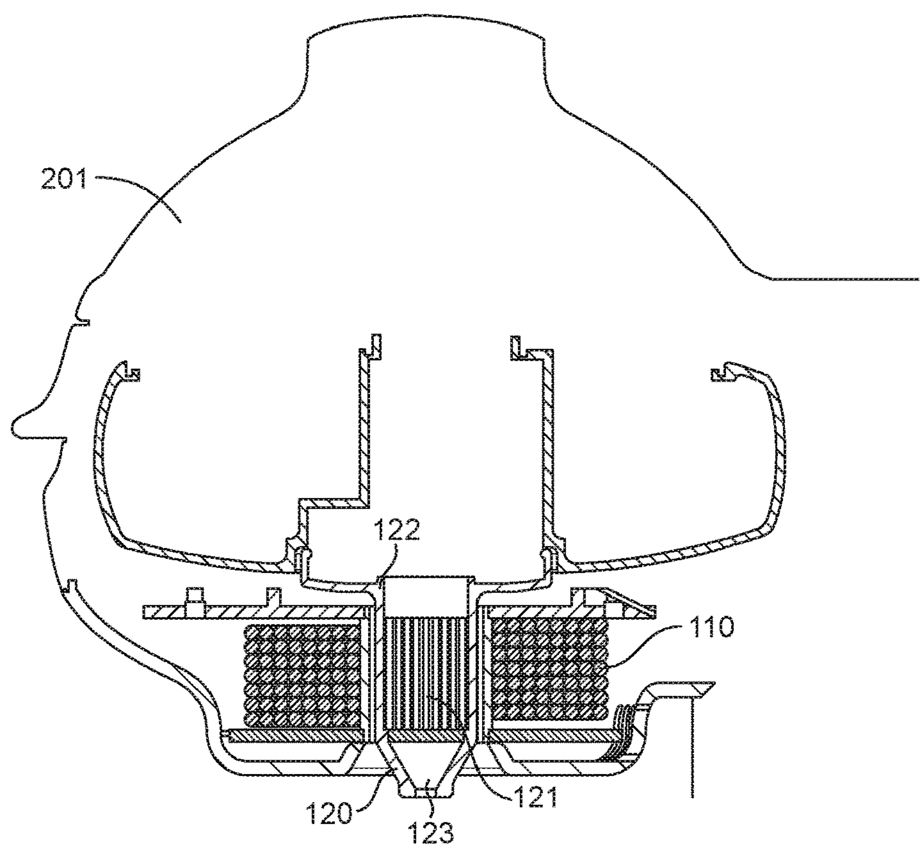
FIG. 2 shows a detailed cross sectional view of the in-line heating device of FIG. 1.

As represented in FIG. 1 or 2, the device 100 of the present disclosure comprises a heating cartridge 120 and a primary heating unit 110. The heating cartridge 120 comprises an outer insert 121, made of an electrically conductive, typically a ferromagnetic material, and which is inductively heatable by an oscillating magnetic field provided by the primary heating unit 110.

In certain non-limiting embodiments, as shown in FIGS. 1-2, the primary heating unit 110 comprises a primary induction coil which is responsible for the creation of an electromagnetic field. By supplying alternating current at high frequency inside this primary induction coil, an alternating electromagnetic field is generated in the surroundings. When approaching the outer insert 121, made of an electrically conductive, typically ferromagnetic material, Eddy currents are generated in it so as to create an electromagnetic field that is opposed to the field generated by the primary induction coil 110. Depending on the resistivity of the outer insert 121, these currents are used to heat it up using Joule losses.

The heating cartridge 120 further comprises an inner heating path 124 through which the fluid and/or food product and/or fluid foam and/or food foam circulates: as the heating path 124 is arranged facing the outer insert 121 or inside the outer insert 121, the outer insert being inductively heated thanks to the alternating electromagnetic field created by the primary coil 110; therefore, fluid is heated while circulating through this path 124 and before it is delivered from the device 100 into a cup 10.

According to the present disclosure, the heating cartridge 120 is configured removable from the rest of the device 100. Therefore, as shown for example in any of FIGS. 1-2, it can be removed and either can be disassembled and therefore made parts accessible for an easy cleaning, or the whole cartridge 120 can be made disposable, after having been used.

As schematically represented in FIGS. 1-2, the heating cartridge 120 is configured having an external cylindrical shape: the outer insert 121 is therefore made having typically the shape of a cylindrical sleeve matching the external shape of the cartridge. This would be understood better and in more detail, following the different embodiments of the heating cartridge 120 according to the present disclosure, as further explained with reference to FIGS. 4*a*-*b*, 5*a*-*c* and 6 *a*-*c*.

Figure 4B:
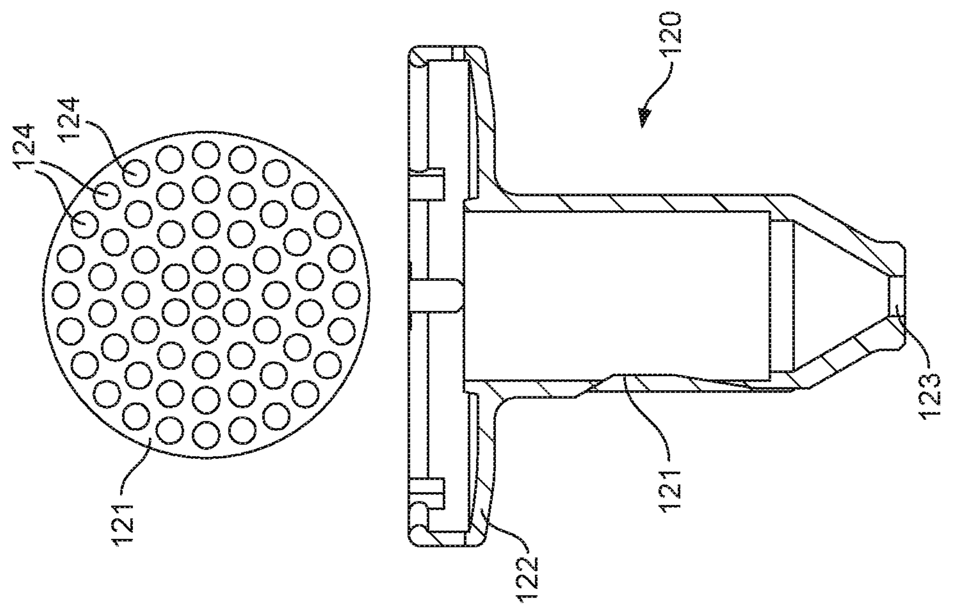
FIG. 4*b* shows a possible configuration of a heating cartridge used in an in-line heating device according to a second embodiment of the present disclosure.
Figure 4A:
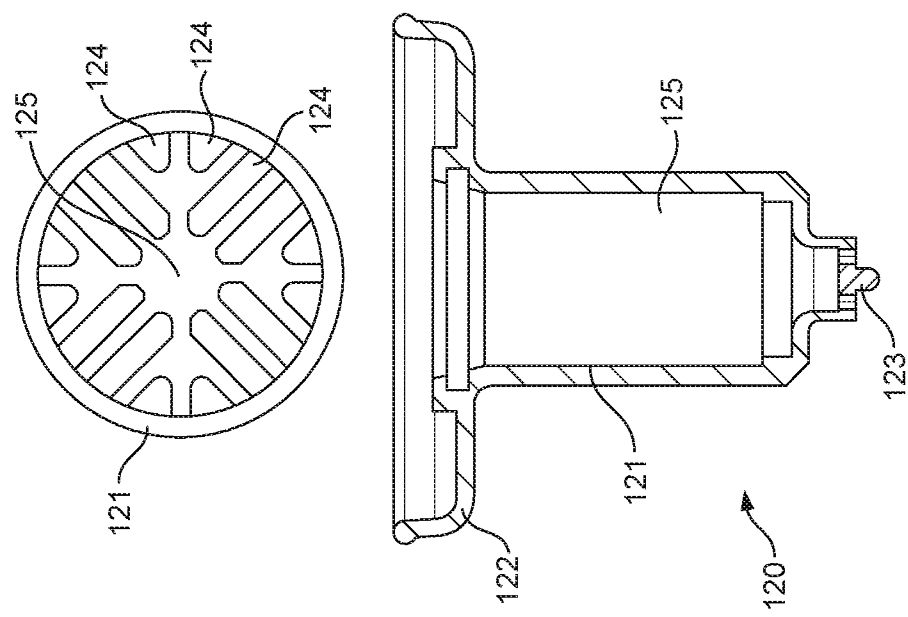
FIG. 4*a* shows a possible configuration of a heating cartridge used in an in-line heating device according to a first embodiment of the present disclosure.

FIG. 4*a* shows a heating cartridge 120 according to a first embodiment of the present disclosure. The cartridge 120 comprises a heating insert 125, here configured having several inner channels and conducts to intricate the flow of the fluid or foam flowing through it in order to increase the contact area with the product flowing. It is clear that this is only a possible shape of the heating insert and that different ones are possible and comprised within the scope of the present disclosure. This inner shape configures the inner heating path 124 through which the fluid or foam flows and is heated. The cartridge 120 further comprises an outer insert 121 configured as a sleeve and surrounding the outer periphery of the heating insert 125. Typically, the outer insert 121 is made of a ferromagnetic material (such as steel), while the heating insert 125 is made in a thermally conductive material, typically aluminium. The sleeve (outer insert 121) is heated thanks to the alternating electromagnetic field created by the primary coil.

In a general manner, according to the present disclosure, the heating insert 125 is made of a thermally conductive material, while the outer insert 121 is made of an electrically conductive material. The idea behind is to cover the two main functionalities described: the outer insert 121 needs to be made of a material which can be inductively heated thanks to the alternating electromagnetic field created by the primary coil. On the other hand, the heating insert 125 needs to be made of a material allowing a good thermal transfer through it in order to heat the product flowing through or inside it. Aluminium is utilized, in certain non-limiting embodiments, as the thermally conductive material as it allows a very good dispersion of heat through it, in a short time, therefore making the heat transfer effective. The particular (but non-limiting) electrically conductive material for the outer insert 121 is a ferromagnetic material, such as steel, allowing the generation of Eddy currents in it creating an electromagnetic field opposed to the field created by the primary coil. The same material can be used for both the outer insert 121 and the heating insert 125; however, particular (but non-limiting) embodiments of the present disclosure use different materials for the outer insert and the heating insert.

FIG. 4*b* shows another configuration of the heating cartridge 120 according to a second embodiment of the present disclosure, where the path 124 is directly made in the heating insert 125. In this embodiment, the heating insert 125 is made of one single piece and is made of a ferromagnetic material or an electrically conductive material. The external part of the heating insert, configured having a cylindrical shape, is also used as the outer insert 121 itself, without the need of providing a further outer sleeve as for example used in FIG. 4*a* of the first embodiment of the present disclosure. Eddy currents circulate in the heating insert 125, without the need for a dedicated sleeve. A possible configuration comprising a plurality of holes is shown (different configurations are also possible): the fluid or food or foam circulates through these holes, configuring internally the path 124, and is heated by contacting the outer walls of the heating insert 125, which are heated thanks to the alternating electromagnetic field created by the primary coil.

This second embodiment (FIG. 4*b*) presents the advantage of cleaning only one piece (the outer insert 121) removed from the rest of the device 100, after the fluid passes through and in case the cartridge 120 is not made disposable. In the embodiment of FIG. 4*a*, there are two pieces to clean after use: the outer insert 121 (the inner wall of it having been in contact with the fluid or foam) and the heating insert 125 through which the fluid or foam has circulated. Also, the cartridge 120 can be made disposable as well in the first embodiment. It is also possible that both parts are mechanically joined: in this case, you remove the whole cartridge 120, without separating any part, and you clean the inside of it, which is the only place through which product or fluid circulated.

FIGS. 5*a-b-c* show different views of a heating cartridge 120 according to a third embodiment of the present disclosure. The cartridge 120 comprises a heating insert 125 which has an inner spiral side, configuring the path 124 through which the fluid or foam circulates. Other different executions (not spiral) would be possible, but this has found to be one of the preferred (albeit non-limiting) ones. The heating insert 125 is made in a thermally conductive material, typically aluminium, allowing a very good heat dispersion. External to it, the outer insert 121 (typically a ferromagnetic material) covers the external part and is, in certain non-limiting embodiments, configured with the shape of a sleeve, to be in close contact with the external walls of the heating insert 125 and therefore heat the fluid or foam through.

In certain non-limiting embodiments, the heating insert 125 is configured having two complementary shaped bodies which, once brought together, configure internally the heating path 124. The bodies can be brought together by means of different joining means or joints, but always easy means allowing their assembly and disassemble in order to be able to access their inner part (the path 124) for cleaning.

In the embodiments shown in FIGS. 4*a-b*, or FIGS. 5*a-c*, the cartridge 120 further comprises a nozzle housing 122 which is arranged externally and surrounding the heating insert 125 and the outer insert 121. This housing 122 is typically made in a non-conductive material, such as (but not limited to) plastics (for example (but not by way of limitation) silicon), so that it isolates the rest of the metallic parts, namely the two outer inserts 125 and 121. Also, it covers externally the cartridge 120 and therefore constitutes an external housing allowing its removal from the rest of the device 100. This part 122 also plays the role of sealing the cartridge 120 with the upper part of the machine and the rest of the fluidic system (fluid inlet).

Figure 6C:
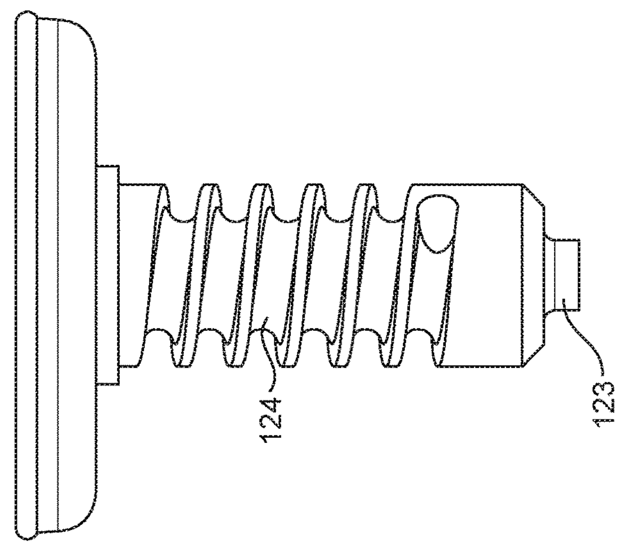
FIGS. 6*a-c* show different views a possible configuration of a heating cartridge used in an in-line heating device according to a fourth embodiment of the present disclosure.
Figure 6B:
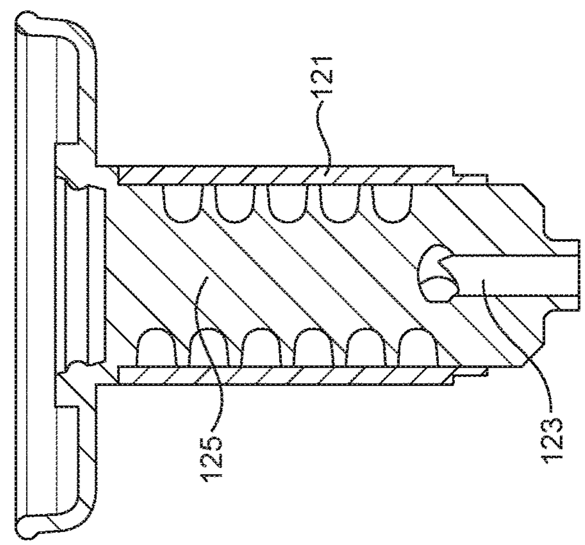
Figure 6A:
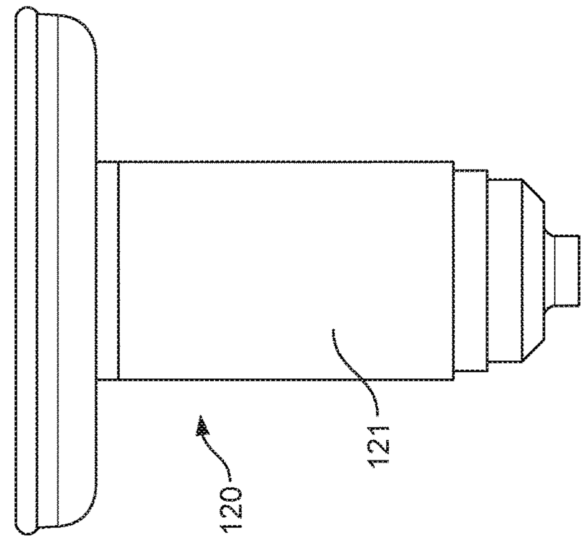

Finally, FIGS. 6*a-b-c* represent different views of a heating cartridge 120 according to a fourth embodiment of the present disclosure. In this fourth embodiment, the cartridge comprises a unique part configuring both the heating path 124 and the heating insert 125, made in non-conductive material, typically in plastics, such as (but not limited to) silicon. Externally, there is the outer insert 121 configured as a sleeve, made in ferromagnetic material, heated thanks to the primary heating unit 110 and allowing heating the fluid or foam through the path 124. As the path through which the fluid flows is made in plastics, non-conductive, and is heated by contact with the outer wall facing the path (inner walls of the outer insert 121), it is clear that the heating is less efficient than in other executions; however, cleaning is performed easily as there is one part less configuring the cartridge, only two parts configuring it, the outer insert 121 and the part configuring at the same time the nozzle housing, the heating path and the heating insert.

The heating device 100 of the present disclosure is capable of delivering hot fluid or hot fluid foam on demand, the fluid or the foam being provided by the machine to which the device is connected, as shown in FIG. 1. As heating is based on induction technology, the system is safer for the user as there is no electric contact between the cartridge and the heating unit (coil). Further, there is no contact between the product (fluid and/or foam) and the machine, so there is no problem of contamination and delicate fluids such as milk can be used advantageously. In the first embodiment of the cartridge 120 (FIG. 4*a*) the parts in contact with the product are the heating insert 125 and the outer insert 121, which can be removed from the rest of the cartridge 120 and can be separated and therefore cleaned. Another possibility would be to make the cartridge disposable. In the second embodiment, represented in FIG. 4*b*, the part in contact with the fluid or foam is the outer insert 121 (configured as unique part) and this part can also be disassembled and cleaned (or it is made disposable).

In the third embodiment of the present disclosure, as shown in FIGS. 5*a-b-c*, there is only one part being in contact with the fluid or the foam, the heating insert 125. In this case, this heating insert is configured in such a way that it can be removed from the rest of the cartridge 120 and it can be separated in two parts, allowing access to its inner path 124 through which the product circulated. Therefore, an easy cleaning of it is allowed, and further joining means allow its later assembly for re-use. Another option would also be to make this part of the whole cartridge disposable.

Finally, in the fourth embodiment of the present disclosure, represented in FIGS. 6*a-b-c*, the fluid or foam circulates through the path 124 (made in the outer insert 125 itself), so the parts in contact with product are the heating insert 125 itself and the outer insert 121 (specifically, its inner wall). As the two parts can be separated, they can be conveniently cleaned. Again, another possible arrangement would be to make the cartridge disposable.

Further advantages of the device of the present disclosure are that it is made having a compact design, further allowing a cartridge temperature control (this would be explained later, with reference to the machine to which the device is connected) and also allowing the heating of cold foam, which provides a higher quality of foam, compared to hot foam creation. Also, traditional ways of heating a fluid or a foam using for example a thermoblock require a higher inertia than the solution proposed with the device of the present disclosure: this makes that longer time is needed for effectively being able to have the thermoblock prepared for heating the fluid/foam, whereas in the case of the present disclosure, it is the outer insert 121 the part that needs to be heated; this part is thin and has a low inertia, thus allowing the device be ready in a short time to heat the fluid flowing through, therefore allows quick heating operations.

Figure 3:
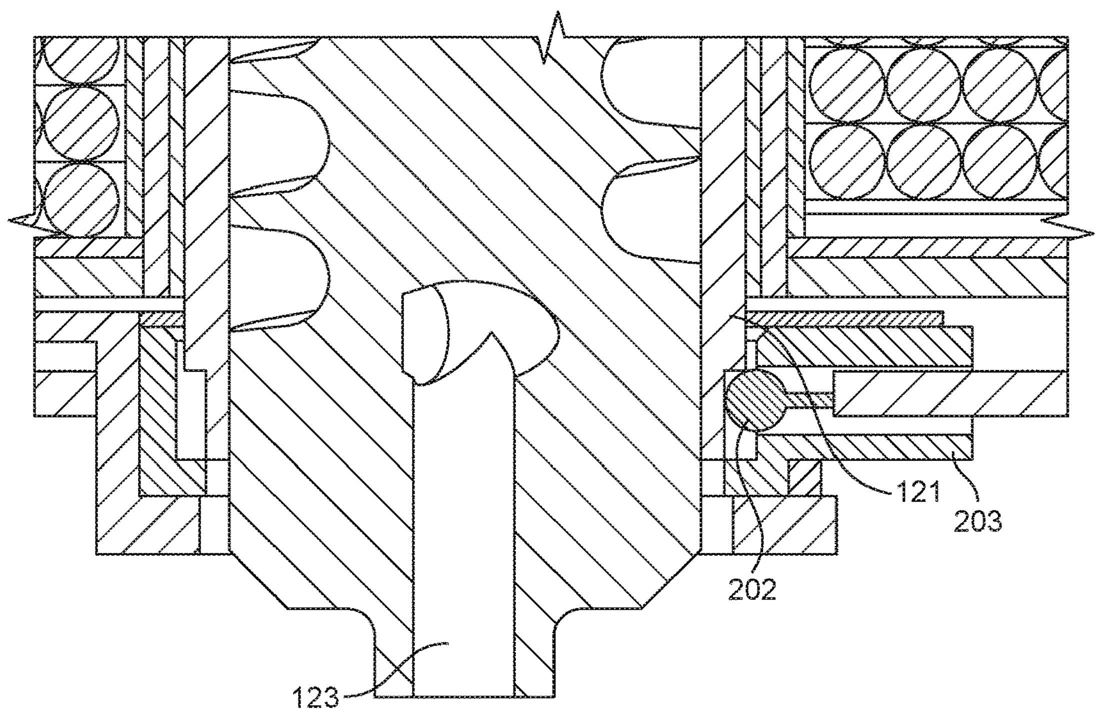
FIG. 3 shows a detailed view of the arrangement of a temperature sensor in an in-line heating device according to the present disclosure.

According to a second aspect, the present disclosure is directed to a foaming machine 200 as schematically represented in FIG. 1. The machine 200 can be a standard or known machine providing a fluid or a food product, particularly a food foam or a fluid foam to the heating device 100, the device being in charge of heating the product delivered by the machine before finally dispensing it into the cup 10. As shown in detail in FIG. 3, the machine 200 comprises a temperature sensor 202 arranged in such a way to have close contact with the outer insert 121 of the cartridge 120.

As the induction technology used is fast and powerful, there is the need to control the temperature of the product in order not to overheat it. This can be made either by measuring the product temperature or the heating element temperature. The second case is the one used by the present disclosure. The machine 200 is further provided with a sensor support 203 to place conveniently the temperature sensor 202 so that there is a close contact between the sensor 202 and the outer insert 121 so that the temperature of the heating element can be correctly determined. Other temperature sensing technologies can be used (e.g. infra-red).

As shown in any of FIG. 1 or 2, the cartridge 120 and the device 100 of the present disclosure are typically arranged in the head 201 of the machine 200.

According to a third aspect, the present disclosure further relates to a system 300 for providing a hot fluid foam and/or a hot food product foam. The system 300 comprises a machine 200 and an in-line heating device 100 as previously described.

Some of the main advantages of the device of the present disclosure include (but are not limited to) the following:

- on-demand heating system based on induction technology;
- removable and cleanable cartridge (only part in contact with the product);
- safe construction for user;
- cartridge temperature control;
- compact design;
- allows cold foam heating (better quality than hot foam creation);
- no contact between product and machine;
- high reactivity thanks to high power density and low inertia;
- scalable technology.

Although the present disclosure has been described with reference to particular embodiments thereof, many modifications and alterations may be made by a person having ordinary skill in the art without departing from the scope of the present disclosure which is defined by the appended claims.

The invention claimed is:

1. An in-line heating device for heating at least one composition selected from the group consisting of a fluid, a food product, a fluid foam, and a food foam, the in-line heating device comprising:
- a primary heating unit; and
- a heating cartridge comprising:
  - an inner heating path configured to circulate the at least one composition;
  - a heating insert with an inner shape defining the inner heating path, wherein the heating insert is made of a thermally conductive material;
  - an outer insert made of an electrically conductive material and configured to be inductively heatable by an oscillating magnetic field provided by the primary heating unit, and wherein the outer insert as a sleeve surrounding an outer periphery of the heating insert,
  - wherein the inner heating path is arranged inside the outer insert so that the at least one composition is heated while circulating through the inner heating path and before being delivered from the in-line heating device; and
  - a nozzle housing arranged to externally surround both the heating insert and the outer insert, the nozzle housing configured to be removable to thereby remove the heating cartridge from the rest of the in-line heating device, and
  - wherein an outlet of the nozzle housing is configured to dispense the at least one composition, that has been heated, into a cup.

2. The in-line heating device of claim 1, wherein a distance between the primary heating unit and the outer insert is configured for heating the at least one composition.

3. The in-line heating device of claim 1, wherein the primary heating unit and the outer insert are distanced by a separated heating space of a dimension such that the outer insert is at least partially positioned inside the oscillating magnetic field provided by the primary heating unit.

4. The in-line heating device of claim 1, wherein the primary heating unit comprises a primary induction coil.

5. The in-line heating device of claim 1, wherein the heating cartridge has an external cylindrical shape, the outer insert is configured as a cylindrical sleeve matching an external cylindrical shape of the heating cartridge.

6. The in-line heating device of claim 1, wherein the heating insert is made of aluminum.

7. The in-line heating device of claim 1, wherein the heating cartridge is disposable after each use.

8. An in-line heating device for heating at least one composition selected from the group consisting of a fluid, a food product, a fluid foam, and a food foam, the in-line heating device comprising:
- a primary heating unit; and
- a heating cartridge comprising:
  - an inner heating path configured to circulate the at least one composition;
  - a heating insert with an inner shape defining the inner heating path; and
  - an outer insert made of an electrically conductive material and configured to be inductively heatable by an oscillating magnetic field provided by the primary heating unit, and wherein the outer insert is a sleeve surrounding an outer periphery of the heating insert, and wherein the heating insert comprises at least two complementary shaped bodies, wherein the at least two complementary shaped bodies are reversibly joined to each other to allow assembly and disassembly of the at least two complementary shaped bodies;

wherein the inner heating path is arranged inside the outer insert so that the at least one composition is heated while circulating through the inner heating path and before being delivered from the in-line heating device, and wherein the at least two complementary shaped bodies of the heating insert configure internally the heating path when brought together;

a nozzle housing arranged to externally surround both the heating insert and the outer insert, the nozzle housing configured to be removable to thereby remove the heating cartridge from the rest of the in-line heating device, and wherein an outlet of the nozzle housing is configured to dispense the at least one composition, that has been heated, into a cup.

9. An in-line heating device for heating at least one composition selected from the group consisting of a fluid, a food product, a fluid foam, and a food foam, the in-line heating device comprising:

a primary heating unit; and a heating cartridge comprising:

an inner heating path configured to circulate the at least one composition;

a heating insert with an inner shape defining the inner heating path;

an outer insert made of an electrically conductive material and configured to be inductively heatable by an oscillating magnetic field provided by the primary heating unit, and wherein the outer insert is a sleeve surrounding an outer periphery of the heating insert, wherein the inner heating path is arranged inside the outer insert so that the at least one composition is heated while circulating through the inner heating path and before being delivered from the in-line heating device; and a nozzle housing arranged to externally surround both the heating insert and the outer insert, the nozzle housing configured to be removable to thereby remove the heating cartridge from the rest of the in-line heating device, and wherein an outlet of the nozzle housing is configured to dispense the at least one composition, that has been heated, into a cup.

10. The in-line heating device of claim 9, wherein the nozzle housing is made of a non-conductive material.

11. A system for providing a hot fluid foam and/or a hot food product foam, the system comprising:

the in-line heating device of claim 1; and a foaming machine providing a fluid foam and/or a food product foam, wherein the foaming machine is configured to receive the in-line heating device.

12. The system of claim 11, wherein the foaming machine comprises a temperature sensor arranged to have close contact with the outer insert of the heating cartridge.

13. A system for providing a hot fluid foam and/or a hot food product foam, the system comprising:

the in-line heating device of claim 8; and a foaming machine providing a fluid foam and/or a food product foam, wherein the foaming machine is configured to receive the in-line heating device.

14. The system of claim 13, wherein the foaming machine comprises a temperature sensor arranged to have close contact with the outer insert of the heating cartridge.

15. A system for providing a hot fluid foam and/or a hot food product foam, the system comprising:

the in-line heating device of claim 9; and a foaming machine providing a fluid foam and/or a food product foam, wherein the foaming machine is configured to receive the in-line heating device.

16. The system of claim 15, wherein the foaming machine comprises a temperature sensor arranged to have close contact with the outer insert of the heating cartridge.

17. A method comprising:

foaming a fluid and/or a food product;

heating the fluid and/or the food product using the system of claim 11; and dispensing the heated composition into a cup.

18. A method comprising:

foaming a fluid and/or a food product;

heating the fluid and/or the food product using the system of claim 13; and dispensing the heated composition into a cup.

19. A method comprising:

foaming a fluid and/or a food product;

heating the fluid and/or the food product using the system of claim 15; and dispensing the heated composition into a cup.

* * * * *